United States Patent [19]
Ziegler et al.

[11] 3,736,025
[45] May 29, 1973

[54] DEVICE FOR POSITIONING A SEATING ARRANGEMENT ESPECIALLY IN MOTOR VEHICLES WITH FINE ADJUSTMENTS

[75] Inventors: Horst Ziegler; Albert Thill, both of 318 Wolfsburg, Germany

[73] Assignee: Volkswagenwerk Aktiengesellschaft, Wolfsburg, Germany

[22] Filed: June 14, 1971

[21] Appl. No.: 152,749

[30] Foreign Application Priority Data

June 25, 1970 Germany.....................P 20 31 383.1

[52] U.S. Cl..................................297/369, 297/379
[51] Int. Cl. ...............................................B60n 1/06
[58] Field of Search......................297/355, 366, 361, 297/368, 362, 369

[56] References Cited

UNITED STATES PATENTS

| | | | |
|---|---|---|---|
| 2,286,784 | 6/1942 | Benzick | 297/368 |
| 1,227,351 | 5/1917 | Weed | 297/355 |
| 2,576,343 | 11/1951 | Hibbard | 297/361 X |
| 3,481,646 | 12/1969 | Tabor | 297/355 |
| 2,809,691 | 10/1957 | Norwood | 297/369 |

FOREIGN PATENTS OR APPLICATIONS

| | | | |
|---|---|---|---|
| 1,065,944 | 4/1967 | Great Britain | 297/366 |
| 617,163 | 3/1961 | Canada | 297/369 |

*Primary Examiner*—Francis K. Zugel
*Attorney*—Ernest F. Marmorek

[57] ABSTRACT

In a motor vehicle, a set arrangement having a seat portion and a backrest pivotably mounted on a common axle with the seat portion and tiltable between a first region of inclination corresponding to a sitting position and a second region of inclination corresponding to a rest position, a positioning device comprising an operating handle disposed at one side of the seat arrangement, first latching device coupled to the operating handle and affecting fine adjustments in the sitting position of the backrest, a second operating handle disposed on the other side of the seat arrangement, a second latching device coupled to the second operating handle and limiting the maximum region of fine adjustments within the sitting position by the first operating handle, the first operating handle affecting the fine adjustments independently of the second operating handle, but the first and second operating handles are actuated simultaneously for transferring the backrest into the rest position.

6 Claims, 6 Drawing Figures

Patented May 29, 1973 3,736,025

INVENTORS.
HORST ZIEGLER
and ALBERT THILL
BY
Ernest A. Marmorek,
THEIR ATTORNEY

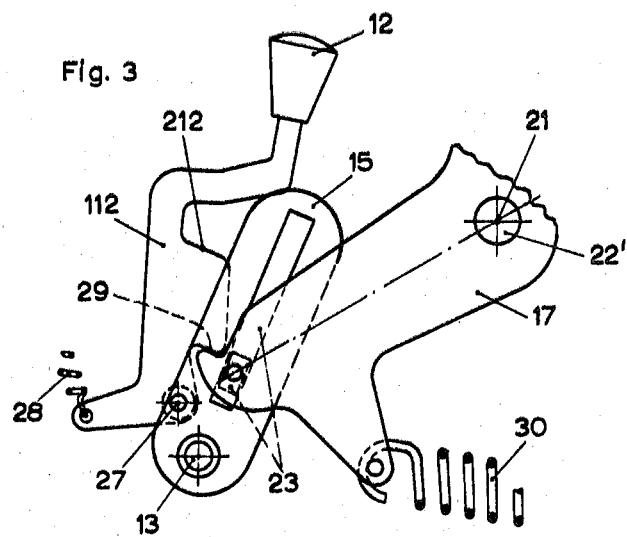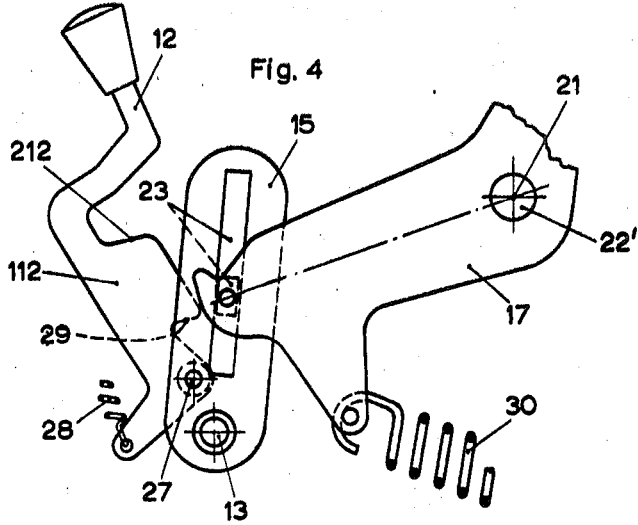

Patented May 29, 1973
3,736,025
3 Sheets-Sheet 3
Fig. 5
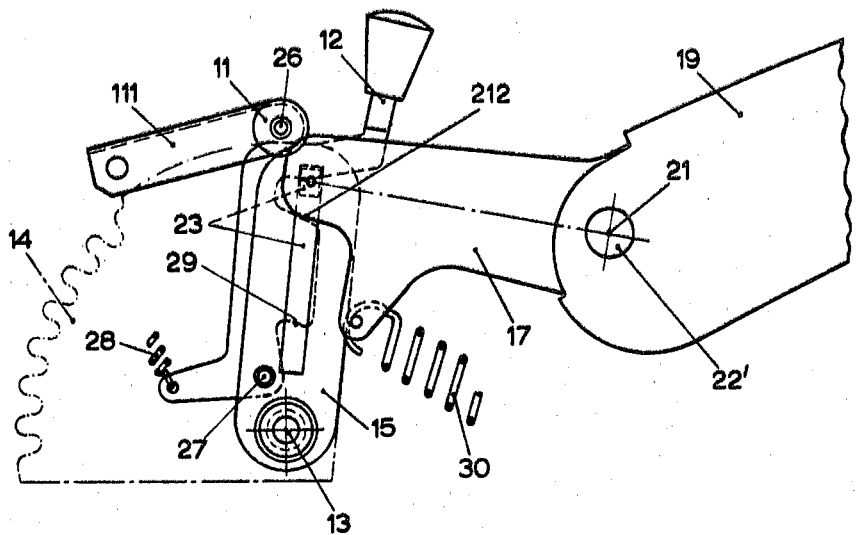
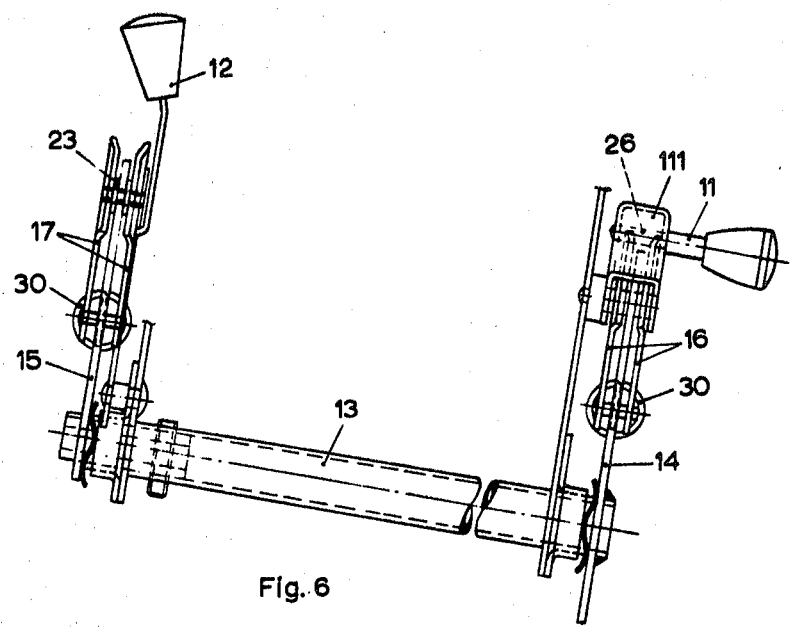
Fig. 6
INVENTORS.
HORST ZIEGLER
and ALBERT THILL
BY
Ernest A. Marmorek,
THEIR ATTORNEY

DEVICE FOR POSITIONING A SEATING ARRANGEMENT ESPECIALLY IN MOTOR VEHICLES WITH FINE ADJUSTMENTS

FIELD OF THE INVENTION

The present invention relates to a positioning device for a seat arrangement especially in motor vehicles, wherein the seat arrangement has a seat portion and an adjustable backrest which is mounted on a common axle of rotation with the seat portion and which from a first inclination region corresponding to the upright or sitting position can be transferred by operating a pair of handles disposed on the two opposite sides of the seat into a region of inclination corresponding to a rest position of the backrest and which, by means of a locking mechanism, can be adjusted to several fine intermediate positions within the first region of inclination by operating only one of the above mentioned handles.

BACKGROUND OF THE INVENTION

In a known positioning device for seat arrangement in motor vehicles the end portion of a transom mounted on one side of the backrest is engaged over by a slide which must be shifted over by a handle in order that the transom could be released and that the backrest could be transferred into its rest position. This positioning or shifting mechanism has its disadvantage in that the end portions of the transom, which protrude freely upward when the backrest is placed into its rest position, may cause injuries. Should the backrest be brought back into the sitting or upright position then the slide must be shifted again and held so long until the end portions of the transom is brought into a position where the slide can engage it again.

In this known positioning device the fine positioning of the backrest in the sitting position, that is, within a first region of the inclination is performed by a handle which is separately mounted from the handle performing the translation of the backrest into the rest position, that is, into its second region of inclination, and more particularly, it is mounted in the back region of the seat.

The above-described known positioning arrangement represents a complicated and difficult task for the operator of the vehicle who, in addition, might be restricted in his freedom of movement by a buckled-up safety belt.

BRIEF SUMMARY OF THE INVENTION.

It is, therefore, an object of the present invention to provide a positioning device for the seating arrangement in motor vehicles which does not possess the above-described disadvantages of heretofore known positioning devices.

According to the present invention in the positioning device for the seat arrangement the handle for the latching or arresting means comprises at the same time the handle also for the positioning mechanism on the side of the seat which affects the positioning in the first region of inclination and which contains also the releasable latch operable by the handle, while on the other side of the seat there is another handle disposed and affecting the operation of a second latch means limiting the region of the first inclination, the arrangement being such that both latching means are independent from each other.

The positioning mechanism according to the present invention comprises positioning members which are mounted outwardly of the axis of rotation of the backrest on a fixedly journaled axle and are in force locked coupling with a side portion of the backrest extended in the form of a lever.

The positioning device can have positioning members placed on both sides and are pivotally secured on a fixed common axle outward of the axle of mounting for the seat and backrest and are force coupled on each side with a lever-like elongation of the side frame of the backrest.

In accordance with the invention the first latching means comprises a latching member having a segment-like portion and provided with recesses into which a locking member associated with a handle enters under the force of a spring.

The invention also provides that the second latching means comprises a handle formed as a lever pivotable about a fixed point of rotation and having a limiting portion onto which a lever-like extension of the side frame of the backrest abuts when the first region of inclination reached its maximum limit.

The invention also provides that the second handle has another limiting portion into which the lever-like extension of the side frame of the backrest engages when the maximum limit of the second region of inclination has been reached, thereby a self-release of the backrest is prevented.

BRIEF DESCRIPTION OF THE DRAWINGS

The invention will become more readily apparent from the following description of preferred embodiments thereof shown in the accompanying drawings, in which:

FIG. 3 is a similar view as FIG. 1 except from the opposite side of the embodiment shown therein;

FIG. 4 is a similar view as FIG. 3 except that the individual elements are in a different operational position;

FIG. 5 is a similar view as FIG. 3 except the individual elements are again in a different operational position; and FIG. 6 is a partial representation of the embodiment of FIG. 1 looking in the direction of the arrow VI.

DESCRIPTION OF THE PREFERRED EMBODIMENTS

Figure 1:
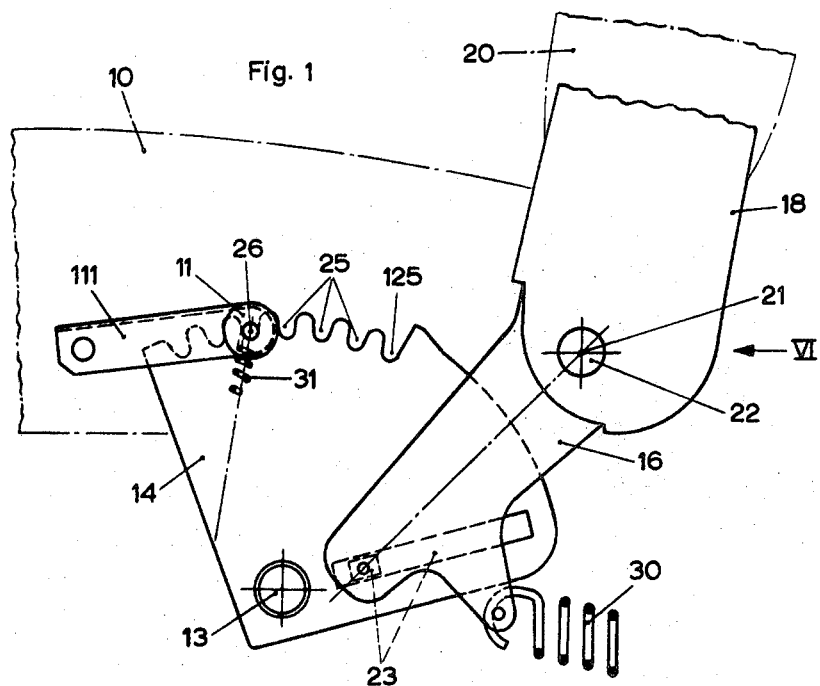
FIG. 1 is a schematic representation in side view of the positioning device according to the present invention.

With reference to FIGS. 1–6 it is seen that the positioning device according to the present invention essentially comprises the handles 11,12 with levers 111 and 112 journaled on the opposite sides of seat 10 and adjusting members 14,15 rigidly mounted on both ends of a journaled axle 13; the adjusting members 14,15 are force locked with side frame portions 18,19 of the backrest 20, the side frame portion 18,19 being extended into the shape of lever arms 16,17 facing the opposite sides of the seat 10. The lever arms 16 and 17 and the backrest 20 with its side frames 18,19 are journaled for angular displacement about a common axis of rotation 21 by bolts 22,22′.

Figure 2:
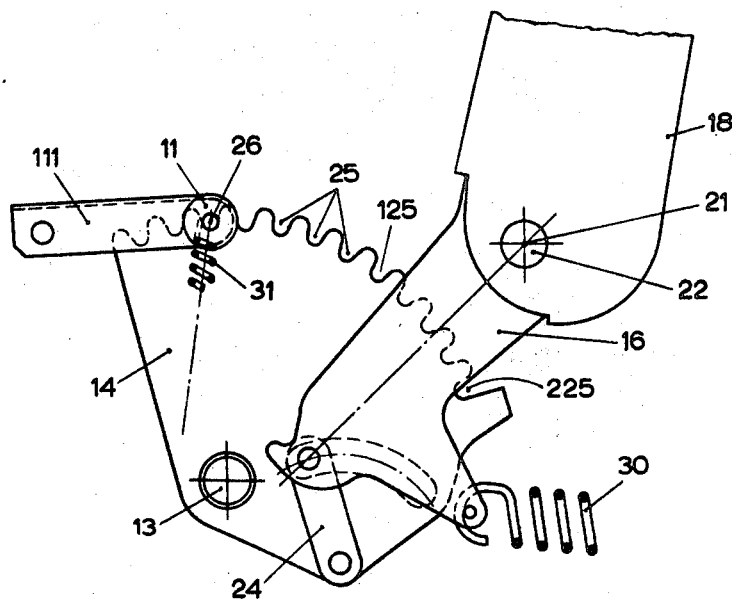
FIG. 2 is a schematic representation in side view, of another embodiment of the positioning device according to the present invention.

In the particular embodiment according to FIG. 1 and 3-6 the force lock coupling between lever arms 16 and 17 of the side frame portions 18,19 with the positioning members 14,15 is accomplished by means of pin and slot connections 23. The translation of the tilting movements of the backrest 20 onto the positioning members 14,15 can be performed also, as seen in FIG. 2, by means of a drag lever 24.

The arresting or locking means for the fine positioning in the sitting position of the backrest 20, that is, in the first region of a relatively small inclination, comprises a segment-like portion forming the positioning or adjusting member 14 rigidly secured on one end of the axle 13 and 10, having teeth-like recesses 25 formed thereon; and a handle 11 forming part of a lever 111 which is also provided by a lock member 26 which under the effect of a tension spring 31 engages one of the teeth-like recesses 25.

The largest inclination of the backrest 20 in the first region of inclination is attained when the locking member 26 engages the recess 125 lying closest to the backrest 20. As seen in FIG. 3, in this position the free end of lever arm 17 of side frame 19 lying on the opposite side of the seat 10 engages a latching or supporting first recess 29 formed in the lever 112 having a fixed point of rotation 27 and is biased by a spring 28. The free end portion of the lever 17 is hook-shaped to match the recess 29 on lever 112.

In order that the backrest 20 could be transferred from its first region of inclination into its second region of a large inclination corresponding to the rest position of the backrest, one must release the latching action formed by the handle 11 engaging the recess 125 on one side of the seat 10 as well as the second latching action formed by the handle 12 engaging the lever 17 on the other side of the seat 10. Inasmuch as both latching actions are controlled independently from each other, both handles 11 and 12 must be released or operated simultaneously when the backrest 20 should be transferred into its second region of inclination. In this manner it is accomplished that by placing the backrest 20 into its first region of inclination, it cannot, by itself, for instance during the travelling of the vehicle, go over into its second region of inclination (FIG. 5) by operating only one handle.

FIG. 4 illustrates the second latching mechanism and its handle 12 in a released or decoupled position while the backrest 20 is in its second region of inclination. As soon as the backrest 20 biased by means of spring 30 in the direction of seat 10 becomes released from its load, it goes back into its locking position illustrated in FIG. 3, whereupon the latching arrangement on the other side of the seat 10 becomes also affected in that the latching member 26 of handle 11 engages the recess 125.

The handle 12 formed as a pivotable lever 112 has a latching or supporting surface 212 formed thereon onto which the free end of side 19 extended into the shape of a lever 17 abuts in the second region of inclination as seen in FIG. 5. In this manner, the backrest 20 prevented from getting disengaged by itself. This releasable latching can be formed also be providing a recess 225 additionally in the positioning member 14, as seen in FIG. 2, which becomes then engaged by the latching member 26 of handle 11.

From the above, it is apparent that although the invention has been described hereinbefore with respect to certain specific embodiments thereof, it is evident that many modifications and changes may be made without departing from the spirit of the invention. Accordingly, by the appended claims, we intend to cover all such modifications and changes as fall within the true spirit and scope of this invention.

We claim:

1. In a seat arrangement, for use in a motor vehicle, in combination,
 a seat portion and a backrest portion, said backrest portion being pivotably mounted relative to said seat portion about a first axis and tiltable between a first region of inclination corresponding to a sitting position and a second region of inclination corresponding to a rest position,
 positioning means comprising
 a first operating device disposed at one side of said seat arrangement,
 first latching means releasably coupled to said first operating device and affecting fine adjustments in inclination of said backrest within said first region of inclination,
 a second operating device disposed on the other side of said seat arrangement,
 second latching means releasably coupled to said second operating device and limiting in the latching position thereof the maximum region of fine adjustments within said first region by said first operating device,
 said first and second latching means being rigidly connected together and tiltable in unison about a second axis spaced apart from said first axis,
 said first and second operating devices when actuated simultaneously releasing said first and second latching means for tilting said backrest about said first axis into said second region of inclination.

2. The combination as claimed in claim 1, wherein said latching means further includes adjusting members rigidly mounted on respective ends of a common axle, said backrest comprising a side frame having an elongated portion on each side of said seat arrangement, and means for coupling said elongated portions to the respective one of said adjusting members.

3. The combination as claimed in claim 2, wherein said first latching means comprises one of said adjusting members, recess means provided on said adjusting member corresponding to desired fine adjustment values of said backrest, locking means, spring means biasing said locking means into engagement with said recess means and securing said backrest in a predetermined position, one of said recess means corresponding to the maximum inclination in said first region.

4. The combination as claimed in claim 3, wherein said adjusting member has a segment-like portion, said recess means being formed like teeth about the periphery of said segment-like portion.

5. The combination as claimed in claim 2, wherein said second latching means comprises said second operating device formed as a handle pivotably mounted about a point of rotation, said handle having a portion formed as a latching surface, said other adjusting member engaging said latching surface when said first operating device is at its maximum position within said first region, thereby said second operating device limiting said maximum position.

6. The combination as claimed in claim 5, wherein said second operating device comprises a second limiting portion, said other adjusting member engaging said limiting portion in said second region and thereby preventing self-release of said backrest from said rest position, said second operating device being constructed to release said backrest from said locked position when operated.

* * * * *